United States Patent [19]
Hakamada et al.

[11] Patent Number: 5,978,554
[45] Date of Patent: Nov. 2, 1999

[54] IMAGE PROCESSING METHOD AND SYSTEM WITH SELECTION OF THRESHOLD MATRIX, FROM GROUP INCLUDING MATRIX WITH THRESHOLDS INTERPOLATED FROM OTHER MATRIXES, BASED ON EDGE RESEMBLANCE IN REFERENCE AREA

[75] Inventors: Junichi Hakamada; Koichi Hashimoto, both of Ibaraki, Japan

[73] Assignee: Riso Kagaru Corporation, Tokyo, Japan

[21] Appl. No.: 08/907,414

[22] Filed: Aug. 7, 1997

[30] Foreign Application Priority Data

Aug. 7, 1996 [JP] Japan ................................. 8-223292

[51] Int. Cl.$^6$ .................................................. H04N 1/405
[52] U.S. Cl. ........................ 395/109; 382/237; 382/270; 350/457; 350/426; 350/465; 350/466
[58] Field of Search ..................... 358/464, 462, 358/465, 456, 457, 466, 534, 535, 298; 395/109; 382/176, 237, 270

[56] References Cited

U.S. PATENT DOCUMENTS 5,587,808  12/1996  Hagihara ................................. 358/464
5,699,454  12/1997  Nakai ..................................... 358/465
5,768,441  11/1995  Yoshizawa .............................. 358/464
5,771,107  12/1995  Fujimoto ................................. 358/464
5,784,488  12/1994  Kuwata ................................... 358/462

*Primary Examiner*—Scott Rogers
*Attorney, Agent, or Firm*—Sughrue, Mion, Zinn, Macpeak & Seas, PLLC

[57] ABSTRACT

An image processing method for determining a characteristic of image data in each area in whole image area and performing binarization processing appropriate for the characteristic, the method comprises the steps of: calculating gradation levels around a pixel in the image data; selecting a threshold value matrix appropriate for the pixel, in response to the calculating step, from the group consisting of a threshold value matrix consisting of single threshold value elements for simple binarization, a threshold value matrix comprising different threshold value elements for halftone processing, and at least one threshold value matrix comprising interpolation of both the threshold value matrixes; and binarizing the pixel by a systematic dither method using the threshold value matrix which is selected in the selecting step.

5 Claims, 3 Drawing Sheets

∗ : CURRENT PIXEL

▨ : RANGE OF IMAGE STORED IN LINE MEMORY

☐ : REFERENCE AREA

EDGE RESEMBLANCE

—··—··— THRESHOLD VALUE MATRIX (a)
—·—·— THRESHOLD VALUE MATRIX (b)
-------- THRESHOLD VALUE MATRIX (c)
———— THRESHOLD VALUE MATRIX (d)

| 170 | 180 | 160 |
|-----|-----|-----|
| 180 | 210 | 200 |
| 180 | 190 | 190 |

IMAGE PROCESSING METHOD AND SYSTEM WITH SELECTION OF THRESHOLD MATRIX, FROM GROUP INCLUDING MATRIX WITH THRESHOLDS INTERPOLATED FROM OTHER MATRIXES, BASED ON EDGE RESEMBLANCE IN REFERENCE AREA

BACKGROUND OF THE INVENTION

This invention relates to a stencil printer for reading an original image through image input means such as a scanner, performing image processing for read original image data, perforating a heatsensitive stencil sheet, and printing (digital printer), a system using an electrophotographic technology for forming a latent image on a photosensitive body and transferring the image to paper (digital copier), or a method and a system for copying onto thermosensible paper, etc.

Generally, pseudo gradation processing using a dot area modulation method including a systematic dither method is used to represent light and shade of an image of multiple-valued image data read through original input means on an image output device that can output only binary data of "0" and "1."

The systematic dither method is as follows: M×N pixels are considered a minimum unit of gradation representation and an M×N threshold matrix corresponding thereto is prepared and is superimposed on the original image with the threshold matrix as a kind of mask for comparing the density of each pixel with its corresponding threshold value. If the image data is greater than the threshold value, "1" is output; if the image data is less than the threshold value, "0" is output. Upon completion of the M×N pixel processing, the threshold matrix is moved to the next M×N pixel position and the same processing is repeated for binarization.

In the pseudo gradation processing using the systematic dither method, gradation is not compatible with resolution. To provide sufficient gradation, the threshold matrix size needs to be enlarged, thus reproducibility of an area requiring resolution like characters worsens.

A method for solving the problem is described in Japanese Patent Application Laid-Open No. Sho 63-180273 as follows: Edge resemblance of an image is calculated and the area is divided into a character area and a photo area according to the calculation result. Binarization with a single threshold value is executed in the character area and binarization with the systematic dither method using a threshold matrix for outputting halftone dots is executed in the photo area. The two different processes are switched for use in both the areas, thereby providing pseudo gradation representation good in gradation and resolution.

In the method, however, the image is separated into the character area and the photo area according to the edge resemblance of the image and the two different binarization processes are switched for each area boundary, so that an output image becomes discontinuous, resulting in a sense of incongruity.

SUMMARY OF THE INVENTION

It is therefore an object of the invention to provide an image processing method and system for suppressing a feeling of wrongness caused by switching two types of binarization processing and providing an image having sufficient gradation levels with good resolution.

According to the invention, there is provided an image processing method for determining a characteristic of image data in each area in whole image area and performing binarization processing appropriate for the characteristic, the method comprising the steps of calculating gradation levels around a pixel in the image data, selecting a threshold value matrix appropriate for the pixel from the group consisting of a threshold value matrix consisting of single threshold value elements for simple binarization, a threshold value matrix comprising different threshold value elements for halftone processing, and at least one threshold value matrix comprising interpolation of both the threshold value matrixes in response to the calculation result, and binarizing the pixel using the selected threshold value matrix.

As a method of calculating gradation levels around a pixel in image data, a current pixel to be processed is selected out of stored image data in sequence and gradation of the peripheries of the current pixel can be calculated by using a reference area made up of the current pixel and the peripheral pixels thereof. A threshold value matrix appropriate for the current pixel is selected from the threshold value matrix group and the current pixel is binarized by using a threshold value in the selected threshold value matrix corresponding to the address of the current pixel.

A system for carrying out the method comprises threshold value matrix storage means being made up of a threshold value matrix consisting of single threshold value elements for simple binarization, a threshold value matrix comprising different threshold value elements for halftone processing, and at least one threshold value matrix comprising interpolation of both the threshold value matrixes, means for calculating gradation levels of a pixel in the image data, and binarization means being responsive to the calculation result of the calculation means for selecting a threshold value matrix appropriate for the pixel out of the threshold value matrix storage means and binarizing the pixel by a systematic dither method using the selected threshold value matrix.

Used as means for calculating gradation of a pixel in image data are means for selecting a current pixel to be processed in sequence and means for calculating gradation levels of the peripheries of the current pixel selected by the current pixel selection means by using a reference area made up of the current pixel and the peripheral pixels thereof. Means for calculating an edge resemblance value of the peripheries of the current pixel can also be used as the calculation means.

DETAILED DESCRIPTION OF PREFERRED EMBODIMENTS

Figure 1:
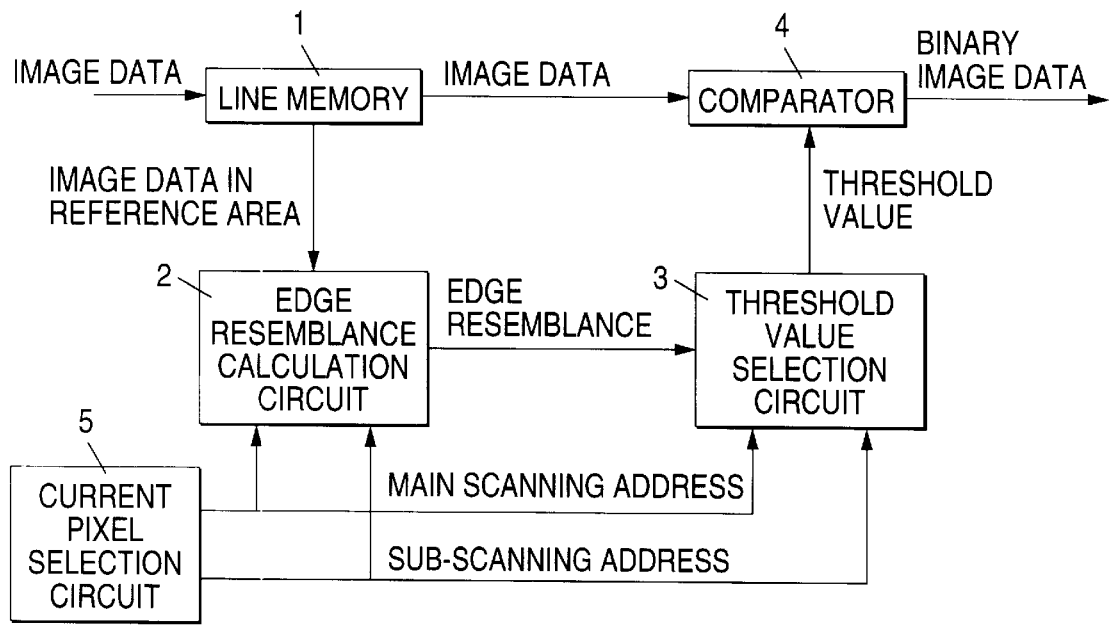
FIG. 1 is a block diagram of an image processing system of one embodiment of the invention.

FIG. 1 is a block diagram of an image processing system of one embodiment of the invention. In original read means (not shown), light is applied to an original, reflected light from the original is converted into electric signals (density signals) by a line sensor such as CCDs, and read image data is output. The image data is input to a line memory 1. Two-line image data containing a current pixel is stored in the line memory 1.

Figure 2:
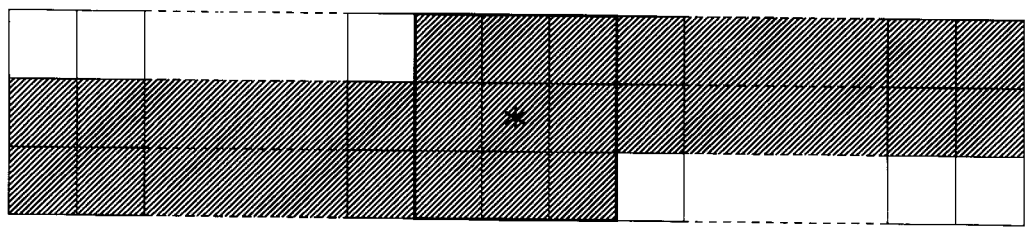
FIG. 2 is an illustration of the positional relationship between a line memory 1 and a reference area in the embodiment of the invention.

Image data in the 3×3 pixel reference area centering on the current pixel selected by a current pixel selection circuit 5 is read from the image data stored in the line memory 1 into an edge resemblance calculation circuit 2 in FIG. 1. FIG. 2 shows the positional relationship between the line memory 1 and the reference area.

The edge resemblance calculation circuit 2 finds the maximum value and minimum value of the image data in the reference area and outputs the difference between the maximum and minimum values as edge resemblance to determine gradation levels around the current pixel. For example, if the image density data in the reference area has a distribution of values shown in FIG. 4, the edge resemblance calculation circuit 2 outputs the difference between the maximum value 210 and the minimum value 160, 50, as an edge resemblance value.

In the embodiment, the difference between the maximum and minimum values of the pixel data in the reference area is used as edge resemblance, but output of an edge detection filter such as a Laplacian filter can also be used as edge resemblance. The Laplacian filter is a filter with a Laplace operator; each pixel is multiplied by the Laplace operator, thereby providing an edge resemblance value in the pixel. The reference area size need not necessarily be 3×3 pixels.

The threshold selection circuit 3 in FIG. 1 selects a threshold value matrix in response to the edge resemblance output from the edge resemblance calculation circuit 2 and determines a threshold value according to the horizontal and vertical scanning direction addresses of the current pixel.

The comparator 4 in FIG. 1 compares the image data of the current pixel output from the line memory 1 with the threshold value output from the threshold selection circuit 3. When the image data is greater than the threshold value, the comparator 4 outputs "1" or when the image data is less than the threshold value, the comparator 4 outputs "0," providing binary image data.

The elements of a threshold value matrix used in the invention are determined by using edge resemblance as a parameter. The threshold value matrix size is selected so as to provide sufficient gradation levels in an area where edge resemblance is low. In the embodiment, the threshold value matrix used in an area where edge resemblance is low is a dot concentration threshold value matrix outputting a halftone dot pattern and the threshold value matrix elements are set to threshold values gradually increasing from the center of the threshold matrix toward the outside thereof.

The threshold value matrix used in an area where resolution is high is of the same size as the dot concentration threshold value matrix and the threshold value matrix elements are set to a single threshold value in order to provide good resolution.

Figures 3, 4:
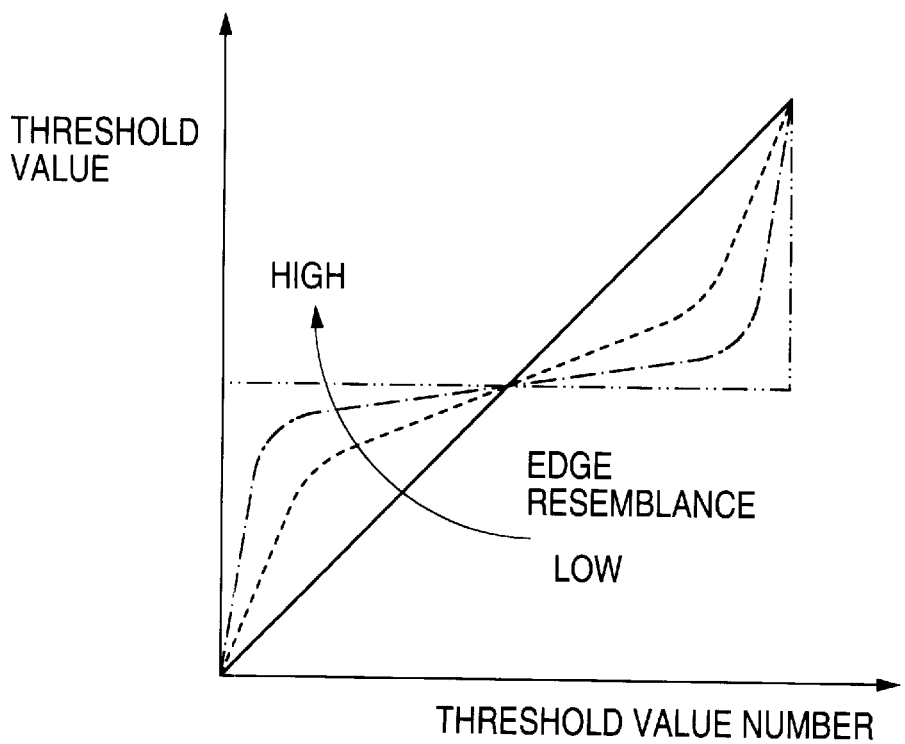
FIG. 3 is an illustration to show the relationship between matrix positions and threshold value matrix elements owing to the edge resemblance difference.
FIG. 4 is an illustration of an example of a value distribution of image density data in a reference area.

Interpolation is executed in response to edge resemblance from the elements of the two threshold value matrixes, providing a number of intermediate threshold value matrixes. FIG. 3 is a graph to show threshold value matrix elements relative to edge resemblance. The horizontal and vertical axes of the graph represent threshold value numbers and binarization threshold values. The threshold values numbers indicate the dotting order when gradation is represented.

Figure 5:
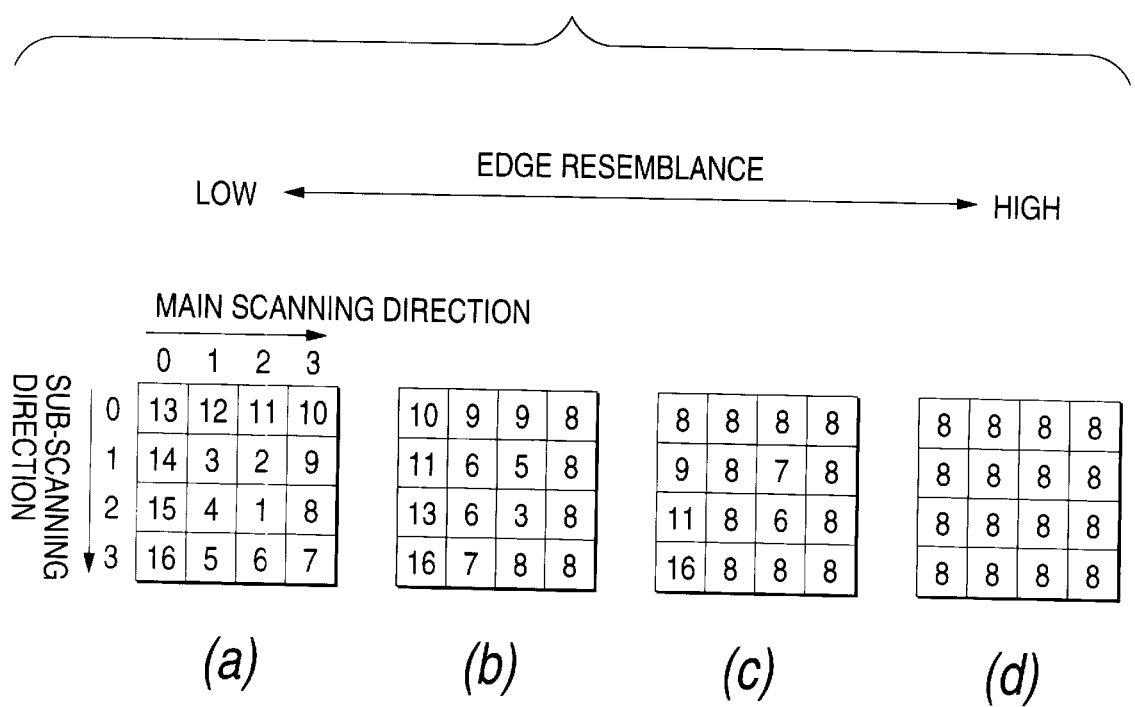
FIG. 5 is an illustration to show examples of threshold value matrixes in the embodiment of the invention.

FIG. 5 shows examples of threshold value matrixes used with the threshold selection circuit 3 in FIG. 1. Here, a threshold value matrix bank having four types of 4×4 threshold value matrixes is taken as an example. The threshold value matrix (a) is provided to faithfully reproduce a halftone image high in gradation levels such as a photo image or an illustration. The matrix has binarization threshold values gradually increasing from the center of the matrix to the outside thereof, so that an output binary image is represented by halftone dots changing in area almost in proportion to the original density. Thus, the 4×4 pixels are assumed to be one block and can be represented with a 17-step gradation from 0 to 16.

On the other hand, the threshold matrix (d) is a simple binarization matrix consisting of single threshold value elements; it is provided to faithfully represent a clear-contrast, high-resolution image such as a character image or a line drawing. The matrix, which has constant binarization threshold values on the matrix, has an advantage in that simple binarization can be executed at resolution in pixel units without one gradation representation with 4×4 pixels.

The threshold value matrixes (b) and (c) are interpolation of the threshold value matrixes (a) and (d) and have both features of the matrixes (a) and (d). They are used when the current pixel cannot be determined to be a gray-scale image or a character image.

The threshold value matrix (b) is used when the current pixel is, if anything, close to a gray-scale image; it inherits much the feature of the threshold matrix (a) and less the feature of the threshold matrix (d).

The threshold value matrix (c) is used when the current pixel is, if anything, close to a character image; it inherits much the feature of the threshold matrix (d) and less the feature of the threshold matrix (a).

A threshold value matrix is selected in response to edge resemblance output from the edge resemblance calculation circuit 2 based on the following rule:

If E<T0, threshold matrix (a) is selected;

if T0<E<T1, threshold matrix (b) is selected;

if T1≦E<T2, threshold matrix (c) is selected; and if T2≦E, threshold matrix (d) is selected, where E is edge resemblance and T0, T1, and T2 are threshold values for determining edge resemblance levels (where T0<T1<T2).

The current pixel is binarized with the threshold value corresponding to the horizontal and vertical scanning direction addresses of the current pixel in the selected threshold value matrix. For example, if the threshold value matrix (a) is selected and the horizontal and vertical scanning direction addresses of the current pixel are 4×m+1 and 4×n+2 respectively (m, n=0, 1, 2, 3, . . . ), 4 is selected as the binarization threshold value.

In the embodiment, we have discussed switching of four threshold value matrixes, but the number of the threshold value matrixes need not necessarily be four and may be three or more than four. A feeling of wrongness caused by switching the threshold value matrixes can be lessened by increasing the number of the matrixes.

In the embodiment, edge resemblance is used as a criterion for determining gradation levels of image data, but other known methods may be applied. Examples of some of the methods are given below:

A weighted matrix is used for filtering and line resemblance is detected, thereby determining character resemblance;

A texture feature is calculated based on a histogram feature and a density collocation matrix (a matrix indicating how the densities in pixel pairs in an image are placed) and character and photo images are distinguished from each other;

A power spectrum of an image is calculated and the magnitude of high-frequency component power is examined, thereby determining whether or not edge property is high;

A number of feature amounts are combined for determination. For example, variations in density values in a reference area and an average density are used as the feature amounts for determination. Since a density value distribution in an area containing contours of a character is separated into paper ground and ink density, dispersion is large. Since density change is small in a photo part, dispersion is small. Since density change is also small in paper ground and solid part, dispersion is small, but they can be distinguished from each other because a feature appears in average density.

Various methods are possible as image gradation levels determination methods; a reference area for determining gradation levels around one pixel is not limited to the peripheries of the pixel. A wider area, for example, more-than-one-line image data, page data, etc., is also used as required.

In the embodiment, an optimum threshold value matrix is selected for each pixel, but several pixels may be assumed to be one pixel block for selecting a threshold value matrix for the pixel block. In doing so, the necessity for determining gradation levels around all pixels is eliminated, so that the whole processing can be speeded up.

In the invention, several threshold value matrixes are provided so that threshold value matrix elements change smoothly with change in gradation levels of an input image. Thus, a threshold value matrix good in gradation reproducibility is selected for an image with high gradation levels like a photo image and a threshold value matrix made up of single threshold values is selected for a binary image like a character image. Further, a threshold value matrix interpolating both the threshold value matrixes is selected for an image having an intermediate feature of photo and character images. Thus, abrupt change of threshold value matrix elements as the threshold value matrixes are changed is eliminated and a feeling of wrongness of an output image disappears.

In the invention, the threshold value matrix group including not only a threshold value matrix consisting of single threshold value elements for simple binarization and a threshold value matrix comprising different threshold value elements for halftone processing, but also at least one threshold value matrix comprising interpolation of both the threshold value matrixes is also provided to binarize a current pixel. Thus, if the calculation accuracy of gradation levels around the current pixel is low, an optimum one can be selected from among a large number of threshold value matrixes in response to the calculated gradation, and a feeling of wrongness in the image after binarization does not occur. Therefore, a page memory for storing image data in an extremely small area surrounding the current pixel is not required and a memory for mere several lines needs only to be provided.

What is claimed is:

1. An image processing method for determining a characteristic of image data in each area in whole image area and performing binarization processing appropriate for the characteristic, the method comprising the steps of:

calculating gradation levels around a pixel in the image data;

selecting a specific threshold value matrix appropriate for the pixel, in response to the calculating step, from the group consisting of threshold value matrixes consisting of single threshold value elements for simple binarization, a threshold value matrix comprising different threshold value elements for halftone processing, and at least one threshold value matrix comprising threshold value elements interpolated from both the other threshold value matrixes; and binarizing the pixel using the specific threshold value matrix which is selected in the selecting step.

2. An image processing method for determining a characteristic of image data in each area in whole image area and performing binarization processing appropriate for the characteristic, the method comprising the steps of:

selecting a current pixel to be processed out of stored image data in sequence;

calculating gradation levels of peripheries of the current pixel by using a reference area made up of the current pixel and peripheral pixels thereof;

selecting a specific threshold value matrix appropriate for the current pixel from the group consisting of threshold value matrixes consisting of single threshold value elements for simple binarization, a threshold value matrix comprising different threshold value elements for halftone processing, and at least one threshold value matrix comprising threshold value elements interpolated from both of the other threshold value matrixes; and binarizing the current pixel by using a threshold value in the selected specific threshold value matrix corresponding to an address of the current pixel.

3. An image processing system for determining a characteristic of image data in each area in whole image area and performing binarization processing appropriate for the characteristic, the system comprising:

threshold value matrix storage means for storing a threshold value matrix consisting of single threshold value elements for simple binarization, a threshold value matrix comprising different threshold value elements for halftone processing, and at least one threshold value matrix comprising threshold value elements interpolated from both the other threshold value matrixes;

means for calculating gradation levels around a pixel in the image data; and binarization means, being responsive to the calculation result of the calculation means, for selecting a specific threshold value matrix appropriate for the pixel out of the threshold value matrix storage means, and for binarizing the pixel using the specific threshold value matrix thus selected.

4. An image processing system for determining a characteristic of image data in each area in whole imaga area and performing binarization processing appropriate for the characteristic, the system comprising:

means for storing the image data;

means for selecting a current pixel to be processed out of the image data storage means in sequence;

threshold value matrix storage means for storing a threshold value matrix consisting of single threshold value elements for simple binarization, a threshold value matrix comprising different threshold value elements for halftone processing, and at least one threshold value matrix comprising threshold value elements interpolated from both of the other threshold value matrixes;

means for calculating gradation levels of peripheries of the current pixel selected by the current pixel selection means by using a reference area made up of the current pixel and peripheral pixels thereof; and binarization means, being responsive to the calculation result of the calculation means, for selecting a specific threshold value matrix appropriate for the current pixel out of the threshold value matrix storage means and binarizing the current pixel by using a threshold value in the selected specific threshold value matrix corresponding to an address of the current pixel.

5. The image processing system according to claim 4, wherein the calculation means includes means for calculating an edge resemblance value of the peripheries of the current pixel.

* * * * *